(12) United States Patent
Zapico Alvarez et al.

(10) Patent No.: US 12,378,627 B2
(45) Date of Patent: Aug. 5, 2025

(54) GALVANNEALED STEEL SHEET

(71) Applicant: ArcelorMittal, Luxembourg (LU)

(72) Inventors: David Zapico Alvarez, Metz (FR); Florence Bertrand, Scy-Chazelles (FR); Joris Giroux, Metz (FR)

(73) Assignee: ArcelorMittal, Luxembourg (LU)

( * ) Notice: Subject to any disclaimer, the term of this patent is extended or adjusted under 35 U.S.C. 154(b) by 0 days.

(21) Appl. No.: 18/538,254

(22) Filed: Dec. 13, 2023

(65) Prior Publication Data

US 2024/0110257 A1    Apr. 4, 2024

Related U.S. Application Data

(62) Division of application No. 16/760,399, filed as application No. PCT/IB2018/058141 on Oct. 19, 2018, now Pat. No. 11,884,987.

(30) Foreign Application Priority Data

Nov. 8, 2017    (WO) .................. PCT/IB2017/001343

(51) Int. Cl.
*C21D 9/46*     (2006.01)
*B32B 15/01*    (2006.01)
(Continued)

(52) U.S. Cl.
CPC .............. *C21D 9/46* (2013.01); *B32B 15/013* (2013.01); *C21D 1/26* (2013.01); *C21D 1/76* (2013.01);
(Continued)

(58) Field of Classification Search
CPC ... C21D 9/46; C21D 1/26; C21D 1/76; C21D 6/002; C21D 6/004; C21D 6/005; C21D 6/008; C21D 9/0062; C21D 2211/001; C21D 2211/002; C21D 2211/005; C21D 2211/008; C21D 9/561; C21D 9/573;
(Continued)

(56) References Cited

U.S. PATENT DOCUMENTS 8,470,102 B2    6/2013    Bertrand et al.
8,592,049 B2    11/2013   Honda et al.
(Continued)

FOREIGN PATENT DOCUMENTS

CN    101688284 A    3/2010
CN    201512572 U    6/2010
(Continued)

OTHER PUBLICATIONS

See International Search Report of PCT/IB2018/058141, dated Jan. 30, 2019.

*Primary Examiner* — Danielle M. Carda
(74) *Attorney, Agent, or Firm* — Davidson Kappel LLC

(57) ABSTRACT

A galvannealed steel sheet obtainable by a method including the provision of a specific steel sheet, a recrystallization annealing with specific heating, soaking and cooling sub-steps using an inert gas, a hot-dip galvanizing and an alloying treatment, wherein the zinc coating is alloyed through diffusion of the iron from the steel sheet such that the zinc coating includes from 5 to 15% by weight of Fe, oxides including FeO, Mn2SiO4 and MnO, the balance being zinc, the steel sheet including internal oxides including FeO, Mn2SiO4 and MnO in the steel sheet.

18 Claims, 1 Drawing Sheet

(51) Int. Cl.
| | |
|---|---|
| *C21D 1/26* | (2006.01) |
| *C21D 1/76* | (2006.01) |
| *C21D 6/00* | (2006.01) |
| *C21D 9/00* | (2006.01) |
| *C21D 9/56* | (2006.01) |
| *C21D 9/573* | (2006.01) |
| *C22C 18/04* | (2006.01) |
| *C22C 38/00* | (2006.01) |
| *C22C 38/02* | (2006.01) |
| *C22C 38/06* | (2006.01) |
| *C22C 38/14* | (2006.01) |
| *C22C 38/38* | (2006.01) |
| *C22C 38/42* | (2006.01) |
| *C22C 38/44* | (2006.01) |
| *C22C 38/46* | (2006.01) |
| *C22C 38/48* | (2006.01) |
| *C22C 38/50* | (2006.01) |
| *C22C 38/54* | (2006.01) |
| *C22C 38/58* | (2006.01) |
| *C23C 2/00* | (2006.01) |
| *C23C 2/02* | (2006.01) |
| *C23C 2/04* | (2006.01) |
| *C23C 2/06* | (2006.01) |
| *C23C 2/26* | (2006.01) |
| *C23C 2/28* | (2006.01) |
| *C23C 2/40* | (2006.01) |
| *C21D 1/74* | (2006.01) |
| *C23C 28/00* | (2006.01) |

(52) U.S. Cl.
CPC ............. *C21D 6/002* (2013.01); *C21D 6/004* (2013.01); *C21D 6/005* (2013.01); *C21D 6/008* (2013.01); *C21D 9/0062* (2013.01); *C21D 9/561* (2013.01); *C21D 9/573* (2013.01); *C22C 18/04* (2013.01); *C22C 38/001* (2013.01); *C22C 38/002* (2013.01); *C22C 38/02* (2013.01); *C22C 38/06* (2013.01); *C22C 38/14* (2013.01); *C22C 38/38* (2013.01); *C22C 38/42* (2013.01); *C22C 38/44* (2013.01); *C22C 38/46* (2013.01); *C22C 38/48* (2013.01); *C22C 38/50* (2013.01); *C22C 38/54* (2013.01); *C22C 38/58* (2013.01); *C23C 2/0038* (2022.08); *C23C 2/02* (2013.01); *C23C 2/0224* (2022.08); *C23C 2/024* (2022.08); *C23C 2/04* (2013.01); *C23C 2/06* (2013.01); *C23C 2/261* (2022.08); *C23C 2/28* (2013.01); *C23C 2/40* (2013.01); *C21D 1/74* (2013.01); *C21D 2201/02* (2013.01); *C21D 2211/001* (2013.01); *C21D 2211/002* (2013.01); *C21D 2211/004* (2013.01); *C21D 2211/005* (2013.01); *C21D 2211/008* (2013.01); *C23C 28/321* (2013.01); *C23C 28/345* (2013.01)

(58) Field of Classification Search
CPC ................. C21D 1/74; C21D 2201/02; C21D 2211/004; C22C 38/001; C22C 38/002; C22C 38/02; C22C 38/06; C22C 38/14; C22C 38/38; C22C 38/42; C22C 38/44; C22C 38/46; C22C 38/48; C22C 38/50; C22C 38/54; C22C 38/58; C22C 38/20; C22C 38/22; C22C 38/26; C22C 38/28; C22C 38/30; C22C 18/04; C22C 38/32; C22C 38/52; C22C 38/00; C23C 2/0038; C23C 2/0224; C23C 2/06; C23C 2/40; C23C 28/321; C23C 28/345; C23C 2/02; C23C 2/024; C23C 2/04; C23C 2/261; C23C 2/28; B32B 15/013
USPC ........................................................ 428/659
See application file for complete search history.

(56) References Cited

U.S. PATENT DOCUMENTS

| | | | |
|---|---|---|---|
| 9,752,221 B2 * | 9/2017 | Fujita | C22C 38/00 |
| 10,344,361 B2 | 7/2019 | Kim et al. | |
| 10,351,924 B2 | 7/2019 | Han et al. | |
| 2008/0053576 A1 | 3/2008 | Takada et al. | |
| 2009/0123651 A1 | 5/2009 | Okada et al. | |
| 2010/0132849 A1 * | 6/2010 | Takagi | C23C 2/02 148/330 |
| 2010/0186854 A1 * | 7/2010 | Bertrand | C23C 2/40 148/276 |
| 2010/0193081 A1 * | 8/2010 | Mataigne | C23C 2/0224 148/276 |
| 2010/0282374 A1 * | 11/2010 | Mataigne | C23C 2/0224 148/320 |
| 2013/0306203 A1 | 11/2013 | Fushiwaki et al. | |
| 2014/0120371 A1 | 5/2014 | Mbacke et al. | |
| 2014/0234657 A1 | 8/2014 | Azuma et al. | |
| 2014/0251505 A1 | 9/2014 | Blumenau et al. | |
| 2016/0363372 A1 | 12/2016 | Takeda et al. | |
| 2017/0137923 A1 | 5/2017 | Chida et al. | |
| 2017/0166990 A1 | 6/2017 | Fushiwaki et al. | |
| 2018/0051356 A1 | 2/2018 | Takeda et al. | |

FOREIGN PATENT DOCUMENTS

| | | |
|---|---|---|
| CN | 109371318 | 2/2019 |
| EP | 2415896 A1 | 2/2012 |
| EP | 3017073 A1 | 5/2016 |
| JP | 2000212648 | 8/2000 |
| JP | 2000336466 A | 12/2000 |
| JP | 2005008939 A | 1/2005 |
| JP | 2006233333 A | 9/2006 |
| JP | 2008156734 A | 7/2008 |
| JP | 2011117040 | 6/2011 |
| JP | 2011117041 A | 6/2011 |
| JP | 4741376 B2 | 8/2011 |
| JP | 2011153367 | 8/2011 |
| JP | 2011219778 A | 11/2011 |
| JP | 2009270126 A | 5/2012 |
| JP | 5434537 B2 | 3/2014 |
| JP | 2014525986 A | 10/2014 |
| JP | 2015180766 A | 10/2015 |
| JP | 2016125131 A | 7/2016 |
| JP | 2017048412 A | 3/2017 |
| KR | 20140051669 A | 5/2014 |
| KR | 101561008 B1 | 10/2015 |
| RU | 2418094 C2 | 5/2011 |
| WO | WO 2007043273 | 4/2007 |
| WO | WO2016121388 A1 | 8/2016 |

\* cited by examiner

GALVANNEALED STEEL SHEET

This is a Divisional of U.S. patent application Ser. No. 16/760,399 filed on Oct. 19, 2018 which is a National Phase of International Patent Application PCT/IB2018/058141 filed on Oct. 19, 2018 which claims priority to International Patent Application PCT/IB2017/001343, filed on Nov. 8, 2017. All of the above are hereby incorporated by reference herein.

The present invention relates to a method for the manufacture of a galvannealed steel sheet and a galvannealed steel sheet. The invention is particularly well suited for the automotive industry.

BACKGROUND

With a view of saving the weight of vehicles, it is known to use high strength steels for the manufacture of automobile vehicle. For example for the manufacture of structural parts, mechanical properties of such steels have to be improved. It is known to add alloying elements to improve the mechanical properties of the steel. Thus, high strength steels or ultra-high strength steels having high mechanical properties including TRIP (Transformation-Induced Plasticity) steel, DP (Dual Phase) steels, HSLA (High-Strength Low Alloyed), TRIPLEX, and DUPLEX are produced and used.

Usually, DP steels have a ferritic—martensitic microstructure. This results in a microstructure consisting of a soft ferrite matrix containing islands of martensite as the secondary phase (martensite increases the tensile strength). The overall behavior of DP steels is governed by among others the phases' volume fraction and morphology (grain size, aspect, ratio, etc.), in addition to the steel chemical composition. DP steels have high ultimate tensile strength (UTS, enabled by the martensite) combined with low initial yield stress (provided by the ferrite phase) and high early-stage strain hardening. These features render DP steels ideal materials for automotive-related sheet forming operations.

Their advantages are: low yield strength, low yield to tensile strength ratio, high initial strain hardening rates, good uniform elongation, a high strain rate sensitivity and good fatigue resistance.

Usually, these steels are coated with a metallic coating improving properties such as corrosion resistance and phosphatability. The metallic coatings can be deposited by hot-dip galvanizing after the annealing of the steel sheets. Sometimes, the hot-dip galvanizing is followed by an alloying treatment so that the iron of the steel sheet diffuses towards the zinc coating in order to obtain a zinc-iron alloy on the steel sheet, called a galvannealed steel sheet. This galvannealed steel sheet has a good welding behavior.

However, in particular for DP steels, during the annealing performed in a continuous annealing line, the alloying elements having higher affinity towards oxygen (compared to iron) such as Manganese (Mn), Aluminum (Al), Silicon (Si) or Chromium (Cr) oxidize and lead to the formation of oxides at the surface. These oxides being for example manganese oxide (MnO) or silicon oxide ($SiO_2$) can be present in a form of a continuous or non-continuous film on the surface of the steel sheet. They prevent the proper adherence of the metallic coating to be applied and can result in zones in which there is no coating on the final product or problems related to the delamination of the coating.

Galvannealing the DP steels is a challenging task because the oxides formed during annealing on the steel sheet can interfere with the Fe—Zn formation. Indeed, the oxides formed can delay the galvannealing since the iron diffusion is hampered. The galvannealing depends on among others the distribution of the oxides at the steel sheet surface, in the steel sheet, the morphology of the oxides and sometimes the nature of the oxides formed.

The patent application EP2415896 discloses a method for manufacturing a high-strength galvanized steel sheet including a zinc plating layer, having a mass per unit area of 20 $g/m^2$ to 120 $g/m^2$, disposed on a steel sheet containing 0.01% to 0.18% C, 0.02% to 2.0% Si, 1.0% to 3.0% Mn, 0.001% to 1.0% Al, 0.005% to 0.060% P, and 0.01% or less S on a mass basis, the remainder being Fe and unavoidable impurities, and includes annealing and galvanizing the steel sheet in a continuous galvanizing line. A temperature region with a furnace temperature of A° C. to B° C. is performed at an atmosphere dew-point temperature of −5° C. or higher in a heating process, where 600≤A≤780 and 800≤B≤900. The dew-point temperature of the atmosphere in the annealing furnace other than a region from A° C. to B° C. is not particularly limited and is preferably within a range from −50° C. to −10° C. It also discloses a method that further comprises alloying the steel sheet by heating the steel sheet to a temperature of 450 to 600° C. after galvanizing such that the content Fe in the zinc plating layer is within a range from 7 to 15% by weight.

A galvannealed steel sheet obtained by the above method has a texture or microstructure in which an oxide of at least one or more selected from the group consisting of Fe, Si, Mn, Al, P, B, Nb, Ti, Cr, Mo, Cu, and Ni is formed in a surface portion of a steel sheet that lies directly under a plating layer and that is within 100 μm from a surface of a base steel sheet at 0.010 $g/m^2$ to 0.50 $g/m^2$ per unit area and a crystalline Si oxide, a crystalline Mn oxide, or a crystalline Si—Mn complex oxide is precipitated in base metal grains that are present in a region within 10 μm down from the plating layer and that are within 1 μm from grain boundaries.

However, by using the above method, there is a risk that an important layer of external oxide such as FeO is formed at the steel sheet surface. In this case, it is difficult to reduce all the external oxide leading to a bad wettability and a bad coating adhesion of the zinc on the steel surface and during the alloying treatment, there is a risk that the diffusion of iron into the zinc coating is considerably delayed. Thus, in this case, there is no interest to perform an alloying treatment to obtain a galvannealed steel sheet.

The patent application JP2008156734 discloses a method for manufacturing a high-strength hot-dip galvanized steel sheet comprising:

subjecting a steel composed of the components described in claim 1 or 2 to hot rolling, pickling and cold rolling, and subjecting the resultant steel sheet to hot-dip galvanizing treatment to manufacture the hot-dip galvanized steel sheet, wherein in the hot rolling, a slab heating temperature is set at 1150 to 1300° C., a finish rolling temperature is set at 850 to 950° C., and a winding temperature is set at 400 to 600° C.;

in the pickling, a bath temperature is set at 10° C. or higher and lower than 100° C., and a concentration of hydrochloric acid is set at 1 to 20%; and in the hot-dip galvanizing treatment, a hydrogen concentration in an atmosphere in a heat treatment furnace from a temperature-rising process to 600° C. or higher to a cooling process to 450° C. via an annealing temperature is set at 2 to 20% and a dew point of the atmosphere is set at −60 to −10° C., and the cold-rolled steel sheet is kept at the annealing temperature of 760 to 860° C. for 10 to 500 seconds, and then cooled at an average cooling rate of 1 to 30° C./sec. The method can also comprise an alloying treatment in a temperature range of 450 to 600° C. for 10 to 120 seconds in order to obtain a galvannealed steel sheet.

It is mentioned that in the inside of the steels sheet, Si-based and Mn-based oxides are formed in the crystal grain boundaries and the grains.

However, in Examples, the alloying treatment time is not mentioned. And, since the oxides are close to the steel sheet surface, there is a risk that the presence of such oxides forms a discontinuous oxides film in the steel sheet inhibiting the diffusion of iron into the zinc coating. Therefore, there is a risk to delay the alloying treatment.

The patent application JP2000212648 discloses a one stage method for producing a high-strength hot-dip galvanized steel sheet with excellent workability and plating adhesiveness, the method comprising the steps of:
subjecting a steel slab comprising 0.10 wt % or less of P to hot rolling followed by pickling, or otherwise subjecting the steel slab to cold rolling;
heating in an atmosphere where a heating temperature T is 750° C. or more and 1000° C. or less and satisfies the following formula (2), a dew point t of an atmosphere gas satisfies the following formula (3) and a hydrogen concentration of an atmosphere gas is 1 to 100 vol %; and then subjecting to hot-dip galvanization:

$$0.85 \leq \{[P(wt\%) + (2/3)]*1150\}/\{T(°C.)\} \leq 1.15 \quad (2);$$

$$0.35 \leq \{[P(wt\%) + (2/3)]*(-30)\}/\{t(°C.)\} \leq 1.8 \quad (3).$$

The method also discloses a further alloying treatment in order to obtain a galvannealed steel sheet.

All the examples of JP2000212648 wherein the one stage heat treatment method is performed (Examples 18-26) include a heat reduction treatment where a heating temperature T is between 810 and 850° C. with a dew point very dry (≤−35° C.) or very humid (≥35° C.) allowing the coating adhesion. The heat reduction treatment between 750 and 1000° C. is followed by an alloying treatment.

The only comparative example of the one stage method of JP2000212648 (Comparative Example 10) is performed with a steel sheet having very low amounts of Si and Cr. In this case, the one stage heat treatment method includes a heat reduction treatment where a heating temperature T is 820° C. with a dew point of 0° C. It was followed by an alloying treatment performed at 480° C. However, P-based oxides were not reduced leading to a bad coating adhesion and a bad appearance after alloying.

The patent application JP2011117040 discloses an alloyed hot-dip galvanized steel sheet comprising a steel sheet base material having a chemical composition comprising, by mass %, 0.01 to 0.25% of C, 0.3 to 2.0% of Si, 0.030 to 3.0% of Mn, 0.050% or less of P, 0.010% or less of S, 0.0060% or less of N, and 0.5% or less of sol. Al, with a balance being Fe and impurities, and a plated layer containing, by mass %, 8.0 to 15% of Fe and 0.15 to 0.50% of Al, on the surface of the steel sheet base material, wherein the steel sheet further comprising a single oxide of Si, Mn or Al, an oxide comprising two or more of these, or a composite oxide comprising two or more of these and Fe, wherein the single oxide, the oxide or the composite oxide is present in the steel sheet base material within a depth of 2 μm from the interface between the plated layer and the steel sheet base material, and the single oxide, the oxide or the composite oxide having a maximum grain diameter of 0.10 μm or less.

It also discloses a method for manufacturing an alloyed hot-dip galvanized steel sheet comprising:
a hot rolling step of hot rolling a steel slab having a chemical composition comprising, by mass %, 0.01 to 0.25% of C, 0.3 to 2.0% of Si, 0.030 to 3.0% of Mn, 0.050% or less of P, 0.010% or less of S, 0.0060% or less of N, and 0.5% or less of sol. Al, and coiling the obtained hot rolled steel sheet at a coiling temperature of 650° C. or lower;
a pickling step of pickling the hot rolled steel sheet;
a cold rolling step of cold rolling the hot rolled steel sheet pickled in the pickling step, at a reduction in thickness of 50% or more; and
a hot-dip galvanizing step of successively subjecting the cold rolled steel sheet after the cold rolling step to: annealing in a reduction annealing furnace in a continuous hot-dip galvanizing line for reduction of the steel sheet surface at a temperature range of 700° C. or higher, under a nitrogen-hydrogen atmosphere with a hydrogen concentration of 1 to 30 vol. % and a dew point of −30° C. to 10° C.; hot-dip galvanization; and an alloying treatment.

Nevertheless, a large number of oxides having a completely different nature can be formed during the annealing including: a single oxide of Si, Mn or Al, an oxide comprising two or more of these, or a composite oxide comprising two or more of these and Fe. The oxides nature, especially oxides including Al and a composite oxide comprising two or more of these and Fe, can be formed in a form of a continuous layer reducing thus the coating adhesion and delaying the galvannealing.

The patent application JP2011153367 discloses a method for producing a galvannealed steel comprising an annealing, a hot-dip galvanizing, and an alloying treatment on a steel sheet comprising, in terms of mass %, C: 0.03 to 0.20%, Mn: 0.03 to 3.0%, Si: 0.1 to 2.5%, S: 0.01% or less, P: 0.1% or less, sol. Al: 1.0% or less, N: 0.01% or less, and Bi: 0.0001 to 0.05%, in heating up to a recrystallization temperature in the annealing, the annealing is performed to the recrystallization temperature with a dew point of −25 to 0° C. in an annealing furnace during heating in the range of at least 650° C. to the recrystallization temperature.

However, the presence of Bismuth in the steel can decrease the mechanical properties of steel. Moreover, there is a risk to decrease the coating adhesion and to delay the galvannealing of high strength steels and ultra-high strength steels.

Additionally, as shown in FIG. 1 of the patent application JP2011153367, the method starts by a purge of the furnace with a $N_2$-10 vol. % $H_2$ gas having a dew point of −60° C. The gas is changed to a predetermined high dew point gas at the start of heating. Indeed, when the sheet temperature reached 650° C., the furnace is again purged with a high dew point gas having a predetermined dew point, e.g. −10° C. After that, when the sheet temperature reached 860° C., which is equal to or higher than the recrystallization temperature, the gas is again switched to the initial low-dew point gas, i.e. −60° C., before the temperature of the sheet is immersed in a plating bath reached 460° C.

Thus, the method requires three purges:
one when starting the method with a gas having a dew point of −60° C.,
one during the annealing when the steel sheet temperature reaches 650° C. with a gas having a dew point of −10° C. and another one during the annealing when the steel sheet temperature reaches 850° C. with a gas having a low dew point gas of −60° C.

This method is very difficult to manage in industrial scale, especially in a continuous annealing line.

Thus, in addition to the recrystallization annealing method, the chemical composition and the steel microstructure, the oxides nature and the oxides repartition which are formed during the recrystallization annealing are also important characteristics to take into account to improve the galvannealing kinetics of DP steels.

SUMMARY OF THE INVENTION

Consequently, there is a need to find a way to improve the wetting and the coating adhesion of high strength steels and ultra-high strength steels, in particular to DP steels comprising a certain amount of alloying elements.

It is an object of the invention to provide a galvannealed steel sheet having a chemical composition including alloying elements, wherein the alloying treatment time is reduced allowing an industrial implementation. Another alternate or additional object is to obtain a galvannealed steel sheet having a high quality, i.e. the diffusion of the iron into the steel was well performed. Finally, a futher alternate or additional object is to provide an easy to implement method for the manufacture of said galvannealed steel sheet.

The present invention provides a method for the manufacture of a galvannealed steel sheet comprising:

A. The provision of a steel sheet having the following chemical composition in weight percent:
   $0.05 \leq C \leq 0.20\%$,
   $1.5 \leq Mn \leq 3.0\%$,
   $0.10 \leq Si \leq 0.45\%$,
   $0.10 \leq Cr \leq 0.60\%$,
   $Al \leq 0.20\%$,
   $V < 0.005\%$
   and on a purely optional basis, one or more elements such as
   $P < 0.04\%$,
   $Nb \leq 0.05\%$,
   $B \leq 0.003\%$,
   $Mo \leq 0.20\%$,
   $Ni \leq 0.1\%$,
   $Ti \leq 0.06\%$,
   $S \leq 0.01\%$
   $Cu \leq 0.1\%$,
   $Co \leq 0.1\%$,
   $N \leq 0.01\%$,
   the remainder of the composition being made of iron and inevitable impurities resulting from the elaboration, B. The recrystallization annealing of said steel sheet in a full radiant tube furnace comprising a heating section, a soaking section, a cooling section, optionally an equalizing section comprising the sub-following steps:
   i. the heating of said steel sheet from ambient temperature to a temperature T1 between 700 and 900° C. in the heating section having an atmosphere A1 comprising from 0.1 to 15% by volume of $H_2$ and an inert gas whose a dew point DP1 is between −18° C. and +8° C.,
   ii. the soaking of the steel sheet from T1 to a temperature T2 between 700 and 900° C. in the soaking section having an atmosphere A2 identical to A1 with a dew point DP2 equal to DP1,
   iii. the cooling of the steel sheet from T2 to T3 between 400 and 700° C. in the cooling section having an atmosphere A3 comprising from 1 to 30% $H_2$ by volume and an inert gas whose a dew point DP3 is below or equal to −30° C.,
   iv. optionally, the equalizing of the steel sheet from a temperature T3 to a temperature T4 between 400 and 700° C. in the equalizing section having an atmosphere A4 comprising from 1 to 30% $H_2$ by volume and an inert gas whose a dew point DP4 is below or equal to −30° C., C. The hot-dip galvanizing of the annealed steel sheet in a zinc bath and D. An alloying treatment performed at a temperature T5 between 460 and 600° C. during a time t5 between 1 and 45 seconds.

A galvannealed steel sheet obtainable from the method and a use of the steel sheet for manufacture as a part in an automotive vehicle are also provided.

Other characteristics and advantages of the invention will become apparent from the following detailed description of the invention.

BRIEF DESCRIPTION OF THE DRAWINGS

To illustrate the invention, various embodiments and trials of non-limiting examples will be described, particularly with reference to the following Figure.

DETAILED DESCRIPTION

The following terms will be defined:
"vol. %" means the percentage by volume,
"wt. %" means the percentage by weight.

The invention relates to a method for the manufacture of a galvannealed steel sheet comprising:

A. The provision of a steel sheet having the following chemical composition in weight percent:
   $0.05 \leq C \leq 0.20\%$,
   $1.5 \leq Mn \leq 3.0\%$,
   $0.10 \leq Si \leq 0.45\%$,
   $0.10 \leq Cr \leq 0.60\%$,
   $Al \leq 0.20\%$,
   $V < 0.005\%$
   and on a purely optional basis, one or more elements such as
   $P < 0.04\%$,
   $Nb \leq 0.05\%$,
   $B \leq 0.003\%$,
   $Mo \leq 0.20\%$,
   $Ni \leq 0.1\%$,
   $Ti \leq 0.06\%$,
   $S \leq 0.01\%$
   $Cu \leq 0.1\%$,
   $Co \leq 0.1\%$,
   $N \leq 0.01\%$,
   the remainder of the composition being made of iron and inevitable impurities resulting from the elaboration, B. The recrystallization annealing of said steel sheet in a full radiant tube furnace comprising a heating section, a soaking section, a cooling section, optionally an equalizing section comprising the sub-following steps:
   i. the heating of said steel sheet from ambient temperature to a temperature T1 between 700 and 900° C. in the heating section having an atmosphere A1 comprising from 0.1 to 15% by volume of $H_2$ and an inert gas whose a dew point DP1 is between −18° C. and +8° C., ii. the soaking of the steel sheet from T1 to a temperature T2 between 700 and 900° C. in the soaking section having an atmosphere A2 identical to A1 with a dew point DP2 equal to DP1, iii. the cooling of the steel sheet from T2 to T3 between 400 and 700° C. in the cooling section having an atmosphere A3 comprising from 1 to 30% $H_2$ by volume and an inert gas whose a dew point DP3 is below or equal to −30° C., iv. optionally, the equalizing of the steel sheet from a temperature T3 to a temperature T4 between 400 and 700° C. in the equalizing section having an atmosphere A4 comprising from 1 to 30% $H_2$ by volume and an inert gas whose a dew point DP4 is below or equal to −30° C., C. The hot-dip galvanizing of the annealed steel sheet in a zinc bath and D. An alloying treatment performed at a temperature T5 between 460 and 600° C. during a time t5 between 1 and 45 seconds.

Figure 1:
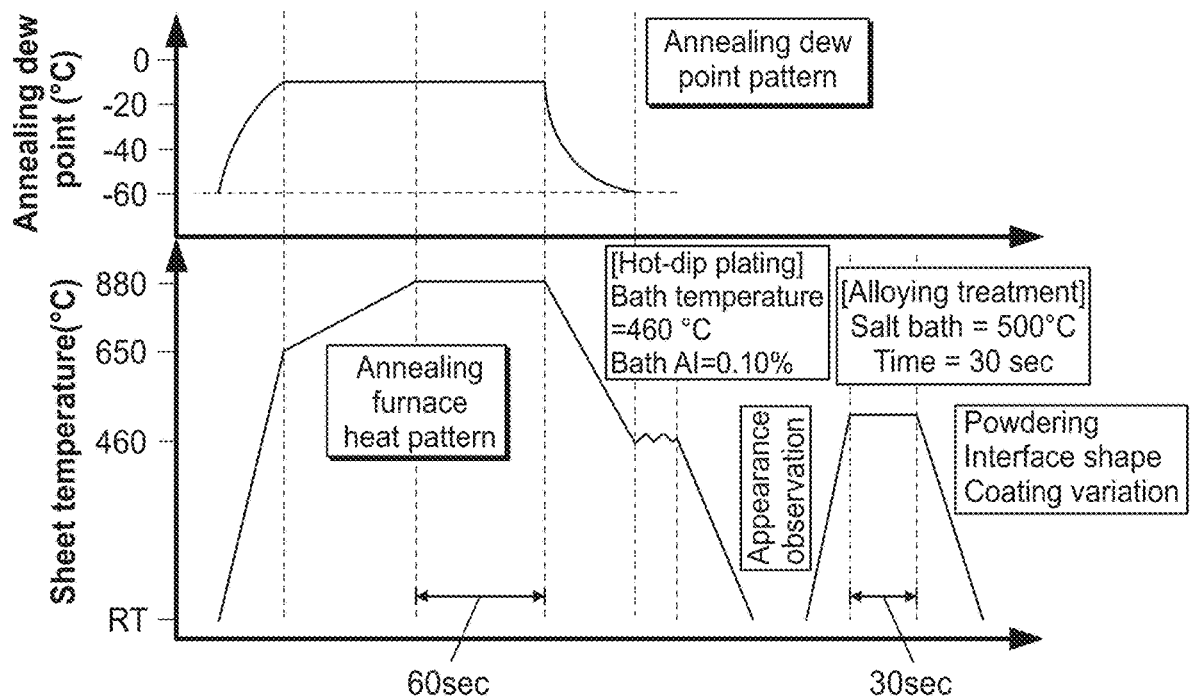
FIG. 1 illustrates one method of the prior art disclosed in the patent application JP2011153367.
Figure 2:
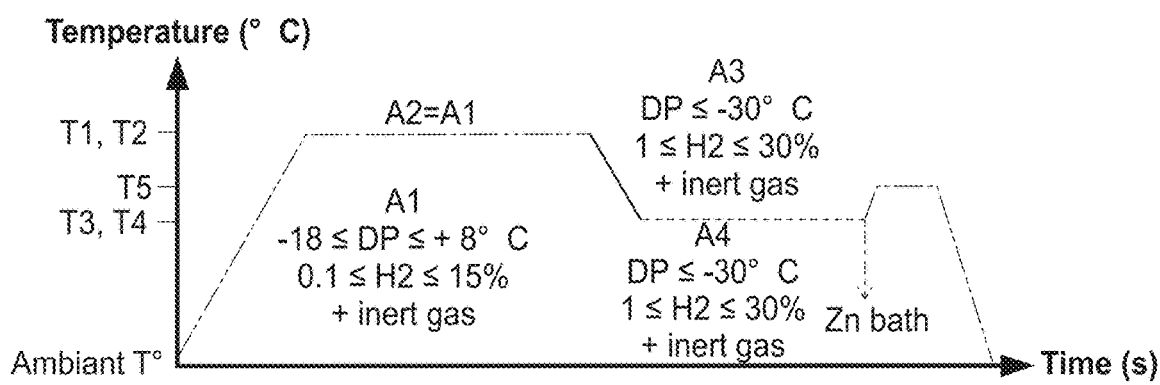
FIG. 2 illustrates one example of the method according to the present invention.

Without willing to be bound by any theory, it seems that the method according to the present invention allows for a high improvement of the wettability and the coating adhesion of the steel sheet having a specific chemical composition. Additionally, with the method according to the present invention, it is possible to perform the alloying treatment in a reduced time. Indeed, on contrary to prior art method such as the one disclosed in JP2011153367 (FIG. 1) and as illustrated in FIG. 2, the inventors have found that the recrystallization annealing according to the present invention performed in a full Radiant Tube Furnace (RTF) wherein the heating and soaking section have the same atmosphere with DP being −18° C. and +8° C., such atmosphere comprising from 0.1 to 15% by volume of H2 allows for the production of a galvannealed steel sheet having a specific oxides repartition allowing a high wettability and having a high quality. In particular, the oxides including MnO, FeO and $Mn_2SiO_4$ are formed during the recrystallization annealing externally at the steel sheet surface and also internally allowing a high wettability and coating adhesion. Preferably, the external oxides are present in form of nodules at the sheet sheet surface. Thus, during the alloying treatment, the iron of the steel can easily diffuse towards the coating in a reduced time.

If the recrystallization annealing of the above specific steel sheet is not performed according to the present invention, in particular if the heating and soaking sections do not have the same atmosphere and if the dew point is below −18° C., there is a risk to form oxides such as MnO, FeO and $Mn_2SiO_4$, such oxides being mainly or only external. Moreover, there is a risk that these oxides form a thick continuous layer at the steel sheet surface decreasing significantly the wettability. In this case, there is no interest to perform the alloying treatment in order to obtain a galvannealed steel sheet.

Moreover, if the heating and soaking sections do not have the same atmosphere and if the dew point is above 8° C., there is a risk to form external oxides such as MnO and FeO and internal oxide such as $Mn_2SiO_4$. Especially, there is a risk that MnO and mainly FeO are formed in a form of a continuous layer at the steel sheet surface decreasing the wettability. In this case, there is no interest to perform the alloying treatment in order to obtain a galvannealed steel sheet.

Regarding the chemical composition of the steel, the carbon amount is between 0.05 and 0.20% by weight. If the carbon content is below 0.050%, there is a risk that the tensile strength is insufficient. Furthermore, if the steel microstructure contains retained austenite, its stability which is necessary for achieving sufficient elongation, cannot be obtained. In a preferred embodiment, the carbon content is in the range between 0.05 and 0.15%.

Manganese is a solid solution hardening element which contributes to obtain high tensile strength. Such effect is obtained when Mn content is at least 1.5% in weight. However, above 3.0%, Mn addition can contribute to the formation of a structure with excessively marked segregated zones which can adversely affect the welds mechanical properties. Preferably, the manganese content is in the range between 1.5 and 2.9% to achieve these effects. This makes it possible to obtain satisfactory mechanical strength without increasing the difficulty of industrial fabrication of the steel and without increasing the hardenability in the welds.

Silicon must be comprised between 0.1 and 0.45%, preferably between 0.1 to 0.30% and more preferably between 0.1 to 0.25% by weight of Si to achieve the requested combination of mechanical properties and weldability: silicon reduces the carbides precipitation during the annealing after cold rolling of the sheet, due to its low solubility in cementite and due to the fact that this element increases the activity of carbon in austenite. It seems that if Si amount is above 0.45%, other oxides are formed at the steel sheet surface decreasing the wettability and the coating adhesion.

Aluminum must be below or equal to 0.20%, preferably below 0.18 by weight. With respect to the stabilization of retained austenite, aluminum has an influence that is relatively similar to the one of the silicon. However, aluminum content higher than 0.20% in weight would increase the Ac3 temperature, i.e. the temperature of complete transformation into austenite in the steel during the annealing step and would therefore make the industrial process more expensive.

Chromium makes it possible to delay the formation of pro-eutectoid ferrite during the cooling step after holding at the maximal temperature during the annealing cycle, making it possible to achieve higher strength level. Thus, the chromium content is between 0.10 and 0.60%, preferably between 0.10 and 0.50% by weight for reasons of cost and for preventing excessive hardening.

Vanadium also plays an important role within the context of the invention. According to the present invention, the amount of V is below 0.005% and preferably $0.0001 \leq V \leq 0.005\%$. Preferably, V forms precipitates achieving hardening and strengthening.

The steels may optionally contain elements such as P, Nb, B, Mo, Ni, Ti, S, Cu, Co, N achieving precipitation hardening.

P and S are considered as a residual element resulting from the steelmaking. P can be present in an amount <0.04% by weight. S can present in an amount below or equal to 0.01% by weight.

Titanium and Niobium are also elements that may optionally be used to achieve hardening and strengthening by forming precipitates. However, when the Nb amount is above 0.05% and/or Ti content is greater than 0.06%, there is a risk that an excessive precipitation may cause a reduction in toughness, which has to be avoided.

The steels may also optionally contain boron in quantity comprised below or equal to 0.003%. By segregating at the grain boundary, B decreases the grain boundary energy and is thus beneficial for increasing the resistance to liquid metal embrittlement.

Molybdenum in quantity below or equal to 0.2% is efficient for increasing the hardenability and stabilizing the retained austenite since this element delays the decomposition of austenite.

The steel may optionally contain nickel, in quantity below or equal to 0.1% so to improve the toughness.

Copper can be present with a content below or equal to 0.1% for hardening the steel by precipitation of copper metal.

Preferably, the chemical composition of the steel does not include Bismuth (Bi). Indeed, without willing to be bound by any theory, it is believed that if the steel sheet comprises Bi, the wettability decreases and therefore the coating adhesion as well.

Preferably, in steps B.i) and B.ii), A1 comprises between 1 and 10% by volume of H2 and more preferably, A1 comprises between 2 and 8% by volume of H2, A2 being identical to A1.

Advantageously, in steps B.i) and B.ii), DP1 is between −15° C. and +5° C., and more preferably, DP1 is between −10 and +5° C., DP2 being equal to DP1.

In a preferred embodiment, in step B.i), the steel sheet is heated from ambient temperature to T1 with a heating rate above 1° C. per second and for example between 2 and 5° C. per second.

Preferably, in step B.i), the heating is performed during a time t1 between 1 and 500 seconds and advantageously between 1 and 300 s.

Advantageously, in step B.ii), the soaking is performed during a time t2 between 1 and 500 seconds and advantageously between 1 and 300 s.

Preferably, in step B.ii), T2 is equal to T1. In this case, in steps B.i) and B.ii), T1 and T2 are between 750 and 850° C., T2 being equal to T1. In another embodiment, it is possible that T2 is below or above T1 depending on the steel sheet chemical composition and microstructure. In this case, in steps B.i) and B.ii), T1 and T2 are between 750 and 850° C. independently from each other.

Preferably, in step B.iii), A3 comprises from 1 to 20% by weight of H2 and more preferably, from 1 to 10% by weight of H2.

Preferably, in step B.iii), DP3 is below or equal to −35° C.

In a preferred embodiment, n step B.iii), the cooling is performed during a time t3 between 1 and 50 seconds.

Advantageously, in step B.iii), the cooling rate is above 10° C. per second and preferably between 15 and 40 ° C. per second.

Advantageously, in step B.iv), A4 comprises from 1 to 20% and more preferably, from 1 to 10% by weight of H2.

Preferably, in step B.iv), DP4 is below or equal to −35° C.

In a preferred embodiment, in step B.iv), the equalizing is performed during a time t4 between 1 and 100 seconds and for example between 20 and 60 seconds.

Advantageously, in steps B.iii) and B.iv), A3 is identical to A4, DP4 being equal to DP3.

Preferably, in step B.iv), T4 is equal to T3. In this case, in steps B.iii) and B.iv), T3 and T4 are between 400 and 550° C. or between 550 and 700° C., T4 being equal to T3. In another embodiment, it is possible that T4 is below or above T3 depending on the steel sheet chemical composition and microstructure. In this case, in steps B.iii) and B.iv), T3 and T4 are between 400 and 550° C. or between 550 and 700° C. independently from each other.

Preferably, in steps B.i) to B.iv), the inert gas is chosen from: N2, Ar, He and Xe.

Preferably in step C), the zinc-based coating comprises between 0.01 and 0.4% by weight of Al, the balance being Zn.

Advantageously, in step D), T5 is between 470 and 570° C., more preferably between 470 and 530° C.

Preferably, in step D), t5 is between 1 and 35 seconds and for example between 1 and 20 s.

In a preferred embodiment, the alloying treatment is performed in atmosphere A5 comprising air.

The invention also relates to a galvannealed steel sheet wherein the zinc coating is alloyed through diffusion of the iron from the steel sheet such that the zinc coating comprises from 5 to 15% by weight of Fe, oxides including FeO, Mn2SiO4 and MnO, the balance being zinc, the steel sheet comprising internal oxides including FeO, Mn2SiO4 and MnO in the steel sheet. Preferably, the oxides comprising FeO, Mn2SiO4 and MnO present in the zinc or aluminum coating are in a form of nodules.

Preferably, the thickness of the coating is between 1 and 15 μm.

Preferably, the steel microstructure comprises bainite, martensite, ferrite and optionally austenite. In one preferred embodiment, the steel microstructure comprises from 1 to 45% of martensite, from 1 to 60% of bainite, the balance being austenite. In another preferred embodiment, the steel microstructure comprises from 1 to 25% of fresh martensite, from 1 to 10% of ferrite, from 35 to 95% of martensite and lower bainite and less than 10% of austenite.

In a preferred embodiment, the surface of steel sheet is decarburized. Preferably, the depth of the decarburization is up to 100 μm, preferably up to 80 μm, from the surface steel sheet. In this case, without willing to be bound by any theory, it is believed that the steel sheet has a better resistance to LME due to the reduction of carbon amount into the steel sheet. Indeed, it seems that carbon is an element highly sensitive to liquid metal embrittlement LME. Additionally, better bendability and better crash behavior.

Finally, the invention relates to the use of the galvannealed steel sheet for the manufacture of a part of an automotive vehicle.

The invention will now be explained in trials carried out for information only. They are not limiting.

EXAMPLES

In this example, DP steels having the following composition in weight percentage were used:

| C | Mn | Si | Cr | Al | Mo | Ti | P | S | Cu | Ni | Nb | V | B | N |
|---|----|----|----|----|----|----|---|---|----|----|----|---|---|---|
| 0.072 | 2.52 | 0.255 | 0.30 | 0.15 | 0.1 | 0.017 | 0.013 | 0.001 | 0.015 | 0.021 | 0.025 | 0.004 | 0.0020 | 0.006 |

All Trials being DP steels were annealed from ambient temperature in a full RTF furnace according to the conditions of Table 1.

Then, all Trials were hot-dip coated in a zinc bath containing 0.117% of Aluminum.

After the coating deposition, the trials were analyzed by naked eyes, scanning electron microscope and Auger spectroscopy. For the wettability, 0 means that the coating is continuously deposited and 1 means that the coating is not continuously deposited. When the wettability was of 0, i.e. really good, the Trials were alloyed in order to obtain a galvannealed steel sheet. When the wettability was of 1, i.e. very bad, there was no need to alloy since the quality of the coating was very bad due to the presence of a lot of unwanted oxides are present at the steel sheet surface.

Results are shown in the Table 1 below.

i. heating the steel sheet from ambient temperature to a temperature T1 between 700 and 900° C. in the heating section having an atmosphere A1 including from 0.1 to 15% by volume of $H_2$ and an inert gas with a dew point DP1 is between −18° C. and +8° C., ii. soaking the steel sheet from T1 to a temperature T2 between 700 and 900° C. in the soaking section having an atmosphere A2 identical to A1 with a dew point DP2 equal to DP1, and

| | Heating section (A1) | | | | Soaking section (A2) | | | | Cooling section (A3) | | | | Equalizing (A4) | | | | Wettability | Alloying treatment | | Presence of FeO, Mn2SiO4, MnO Oxides | | Coating thickness |
|---|---|---|---|---|---|---|---|---|---|---|---|---|---|---|---|---|---|---|---|---|---|---|
| Trials | DP1 (° C.) | T1 (° C.) | % H2 | t1 (s) | DP2 (° C.) | T2 (° C.) | % H2 | t2 (s) | DP3 (° C.) | T3 (° C.) | % H2 | t3 (s) | DP4 (° C.) | T4 (° C.) | % H2 | t4 (s) | | T5 (° C.) | t5 (s) | in the coating | In the steel | (μm) |
| 1 | +18 | 780 | 5 | 209 | +18 | 780 | 5 | 72 | −40 | 460 | 5 | 10 | −40 | 460 | 5 | 35 | 1 | ND | ND | — | — | — |
| 2 | +15 | 780 | 5 | 209 | +15 | 780 | 5 | 72 | −40 | 460 | 5 | 10 | −40 | 460 | 5 | 35 | 1 | ND | ND | — | — | — |
| 3 | +10 | 780 | 5 | 209 | +10 | 780 | 5 | 72 | −40 | 460 | 5 | 10 | −40 | 460 | 5 | 35 | 1 | ND | ND | — | — | — |
| 4* | +5 | 780 | 5 | 209 | +5 | 780 | 5 | 72 | −40 | 460 | 5 | 10 | −40 | 460 | 5 | 35 | 0 | 470 | 20 | yes | yes | 9.4 |
| 5* | 0 | 780 | 5 | 209 | 0 | 780 | 5 | 72 | −40 | 460 | 5 | 10 | −40 | 460 | 5 | 35 | 0 | 470 | 28 | yes | yes | 9.0 |
| 6* | −10 | 780 | 5 | 209 | −10 | 780 | 5 | 72 | −40 | 460 | 5 | 10 | −40 | 460 | 5 | 35 | 0 | 470 | 40 | yes | yes | 9.7 |
| 7* | −15 | 780 | 5 | 209 | −15 | 780 | 5 | 72 | −40 | 460 | 5 | 10 | −40 | 460 | 5 | 35 | 0 | 470 | 40 | yes | yes | 9.5 |
| 8 | −20 | 780 | 5 | 209 | −20 | 780 | 5 | 72 | −40 | 460 | 5 | 10 | −40 | 460 | 5 | 35 | 1 | ND | ND | — | — | — |
| 9 | −30 | 780 | 5 | 209 | −30 | 780 | 5 | 72 | −40 | 460 | 5 | 10 | −40 | 460 | 5 | 35 | 1 | ND | ND | — | — | — |
| 10 | −40 | 780 | 5 | 209 | −40 | 780 | 5 | 72 | −40 | 460 | 5 | 10 | −40 | 460 | 5 | 35 | 1 | ND | ND | — | — | — |
| 11 | −50 | 780 | 5 | 209 | −50 | 780 | 5 | 72 | −50 | 460 | 5 | 10 | −50 | 460 | 5 | 35 | 0 | 470 | 76 | no | no | 10.7 |
| 12 | −60 | 780 | 5 | 209 | −60 | 780 | 5 | 72 | −60 | 460 | 5 | 10 | −60 | 460 | 5 | 35 | 0 | 470 | 72 | no | no | 10.8 |

*Examples according to the present invention.
ND: not done.

Trials 4 to 7 according to the present invention and Examples 11 and 12 show a good wettability. Nevertheless, for Trials 4 to 7, the alloying time was significantly reduced compared to Trials 11 and 12. Moreover, the surface aspect of the coating was significantly good for the Examples according to the present invention.

What is claimed is:

1. A galvannealed steel sheet obtainable by a method comprising:
  A. providing a steel sheet having the following chemical composition in weight percent:
   0.05≤C≤0.20%,
   1.5≤Mn≤3.0%,
   0.10≤Si≤0.45%,
   0.10≤Cr≤0.60%,
   0≤Al≤0.20%,
   0≤V<0.005%,
   0≤P<0.04%,
   0≤Nb≤0.05%,
   0≤B≤0.003%,
   0≤Mo≤0.20%,
   0≤Ni≤0.1%,
   0≤Ti≤0.06%,
   0≤S≤0.01%
   0≤Cu≤0.1%,
   0≤Co≤0.1%,
   0≤N≤0.01%,
   a remainder of the composition being made of iron and inevitable impurities resulting from processing;
  B. recrystallization annealing the steel sheet in a full radiant tube furnace comprising a heating section, a soaking section, and a cooling section, and optionally an equalizing section, the recrystallization annealing including the following sub-steps:
   i. heating the steel sheet from ambient temperature to a temperature T1 between 700 and 900° C. in the heating section having an atmosphere A1 including from 0.1 to 15% by volume of $H_2$ and an inert gas with a dew point DP1 is between −18° C. and +8° C.,
   ii. soaking the steel sheet from T1 to a temperature T2 between 700 and 900° C. in the soaking section having an atmosphere A2 identical to A1 with a dew point DP2 equal to DP1, and
   iii. cooling the steel sheet from T2 to T3 between 400 and 700° C. in the cooling section having an atmosphere A3 including from 1 to 30% $H_2$ by volume and an inert gas with a dew point DP3 is below or equal to −30° C., and
   iv. optionally, equalizing the steel sheet from a temperature T3 to a temperature T4 between 400 and 700° C. in the equalizing section having an atmosphere A4 including from 1 to 30% $H_2$ by volume and an inert gas with a dew point DP4 is below or equal to −30° C.,
  C. hot-dip galvanizing of the annealed steel sheet in a zinc bath; and
  D. alloying the galvanized annealed steel sheet, the alloying performed at a temperature T5 between 460 and 600° C. during a time t5 between 1 and 45 seconds;
  wherein the zinc coating is alloyed through diffusion of the iron from the steel sheet such that the zinc coating includes from 5 to 15% by weight of Fe, oxides including FeO, $Mn_2SiO_4$ and MnO, the balance being zinc, the steel sheet including internal oxides including FeO, $Mn_2SiO_4$ and MnO in the steel sheet.

2. The galvanized steel sheet as recited in claim 1 wherein in step A), the steel sheet includes less than 0.30% by weight of Si.

3. The galvanized steel sheet as recited in claim 1 wherein in step A), the steel sheet includes above 0.0001% by weight of V.

4. The galvanized steel sheet as recited in claim 1 wherein in steps B.i) and B.ii), A1 includes between 1 and 10% by volume of $H_2$.

5. The galvanized steel sheet as recited in claim 1 wherein in steps B.i) and B.ii), DP1 is between −15° C. and +5° C.

6. The galvanized steel sheet as recited in claim 1 wherein in step B.ii), T2 is equal to T1.

7. The galvanized steel sheet as recited in claim 1 wherein in steps B.i) and B.ii), T1 and T2 are between 750 and 850° C.

8. The galvanized steel sheet as recited in claim 1 wherein in steps B.iii) and the optional sub-step B.iv), A3 is identical to A4, DP4 being equal to DP3.

9. The galvanized steel sheet as recited in claim 1 wherein in steps B.i), B.ii) and B.iii) and the optional sub-step B.iv), the inert gas is chosen from the group consisting of: $N_2$, Ar, He and Xe.

10. The galvanized steel sheet as recited in claim 1 wherein the zinc-based coating includes between 0.01 and 0.4% by weight of Al, the balance being Zn.

11. The galvanized steel sheet as recited in claim 1 wherein in step D), T5 is between 470 and 570° C.

12. The galvanized steel sheet as recited in claim 1 wherein in step D), t5 is between 1 and 35 seconds.

13. The galvanized steel sheet as recited in claim 1 wherein the chemical composition of the steel does not include Bismuth (Bi).

14. The galvanized steel sheet as recited in claim 1 wherein the equalizing sub-step is performed.

15. The galvannealed steel sheet as recited in claim 1 wherein the oxides present in the zinc coating are in a form of nodules.

16. The galvannealed steel sheet as recited in claim 15 wherein the steel microstructure includes bainite, martensite, ferrite and optionally austenite.

17. The galvannealed steel sheet as recited in claim 1 wherein the surface of steel sheet is decarburized.

18. A part of an automotive vehicle comprising the galvannealed steel sheet as recited in claim 1.

* * * * *